Nov. 9, 1971 V. H. ASKE 3,618,399
ANGULAR RATE SENSOR
Original Filed Dec. 19, 1968 4 Sheets-Sheet 3

INVENTOR.
VERNON H. ASKE
BY Ronald T. Reiling
ATTORNEY

Nov. 9, 1971  V. H. ASKE  3,618,399
ANGULAR RATE SENSOR
Original Filed Dec. 19, 1968  4 Sheets-Sheet 4

INVENTOR.
VERNON H. ASKE
BY Ronald T. Reiling
ATTORNEY

United States Patent Office 3,618,399
Patented Nov. 9, 1971

3,618,399
ANGULAR RATE SENSOR
Vernon H. Aske, Hopkins, Minn., assignor to
Honeywell Inc., Minneapolis, Minn.
Continuation of application Ser. No. 785,256, Dec. 19, 1968. This application Oct. 20, 1969, Ser. No. 867,450
Int. Cl. G01c 19/42; G01p 3/26
U.S. Cl. 73—505
3 Claims

ABSTRACT OF THE DISCLOSURE

An apparatus for measuring angular velocity about one or more axes comprising an angular accelerometer rotated so that the angle between its sensitive axis and a measurement axis varies with time. This relative motion causes the angular accelerometer to experience a time-varying angular rate, i.e., acceleration, about its sensitive axis, with a component of its output indicative of the rate existing about the measurement axis. The output of the fundamental device is demodulated by appropriate means to This application is a continuation of applicant's co-pending application Ser. No. 785,252, filed Dec. 19, 1968.

BACKGROUND

This invention relates to angular motion sensors, and more particularly to sensors for measuring angular velocity.

Many prior art angular velocity sensors operate on gyroscopic or precession principles to measure angular velocity. They are generally complicated mechanisms relying on a great number of moving parts of high precision and cost. Because they operate on gyroscopic principles, even those not so mechanically complex are subject to inherent errors such as temperature effects, mass imbalance, and dynamic cross coupling.

One newer approach to multiple axis angular velocity sensors takes advantage of the inertial reaction of a mercury body rotating at high speed. The mercury is contained in a spherical chamber supported by a spin axis bearing system and driven by a motor. Within the sphere are two sensor cells. As the mercury body rotates, the reaction of the angular momentum vector and the applied angular velocity vector causes precession of the mercury which coacts with the sensors to generate a sinusoidal output signal. The amplitude of that signal is proportional to the input rate, and the phase is indicative of the direction of the input rate. A spin axis timing signal is supplied by a reference signal generator, thus permitting the output signal to be resolved into components indicative of rate about any of a plurality of axes. But as with other prior art rate sensors, the device relies on gyroscopic principles for its operation and would therefore be subject to several errors inherent in prior art sensors. For example, since the device depends on the piezoelectric properties of the sensor cells, it is temperature sensitive and its environment must be controlled accordingly. A linear acceleration of the device results in a rate error in the output signal. The device is subject to the dynamic cross coupling error characteristic of gyroscopic devices. Furthermore, the device has a substantial null uncertainty.

BRIEF SUMMARY OF THE INVENTION

The present invention approaches the problem of angular velocity sensing in a novel and unique way not involving gyroscopic principles. It utilizes a single-axis angular accelerometer as a fundamental inertial element to sense angular velocity about one or more axes. The basic operation involves rotating or otherwise moving the fundamental inertial element so that its sensitive axis comes into varying degrees of alignment with the axis or axes about which rate is to be measured. The output signal of the device is therefore a time and position-varying indication of the applied angular rate or rates. Apparatus may be employed to produce a reference signal indicative of the displacement of the sensitive axis from the axes of measurement. By use of appropriate demodulation apparatus, the output of the fundamental device may be resolved into components representative of angular velocity about the measurement axis.

The instant invention overcomes or eliminates many of the problems of prior art gyroscopic angular velocity sensors. In its preferred embodiment the present apparatus eliminates the need for a null adjustment and has virtually no null uncertainty. It can operate over a wide temperature range without the need for temperature regulation. The device is insensitive to linear acceleration because there is no mass imbalance, and it has none of the dynamic cross coupling error characteristics of gyroscopic sensors. The output signal is self-generating, thus eliminating the need for an external power source, and the rotation motor can be unregulated since the output is substantially independent of rotation motor speed. In view of these advantages and others which will become apparent, the invention constitutes a significant advance in the state of the art.

DESCRIPTION OF THE PREFERRED EMBODIMENT

Figure 1:
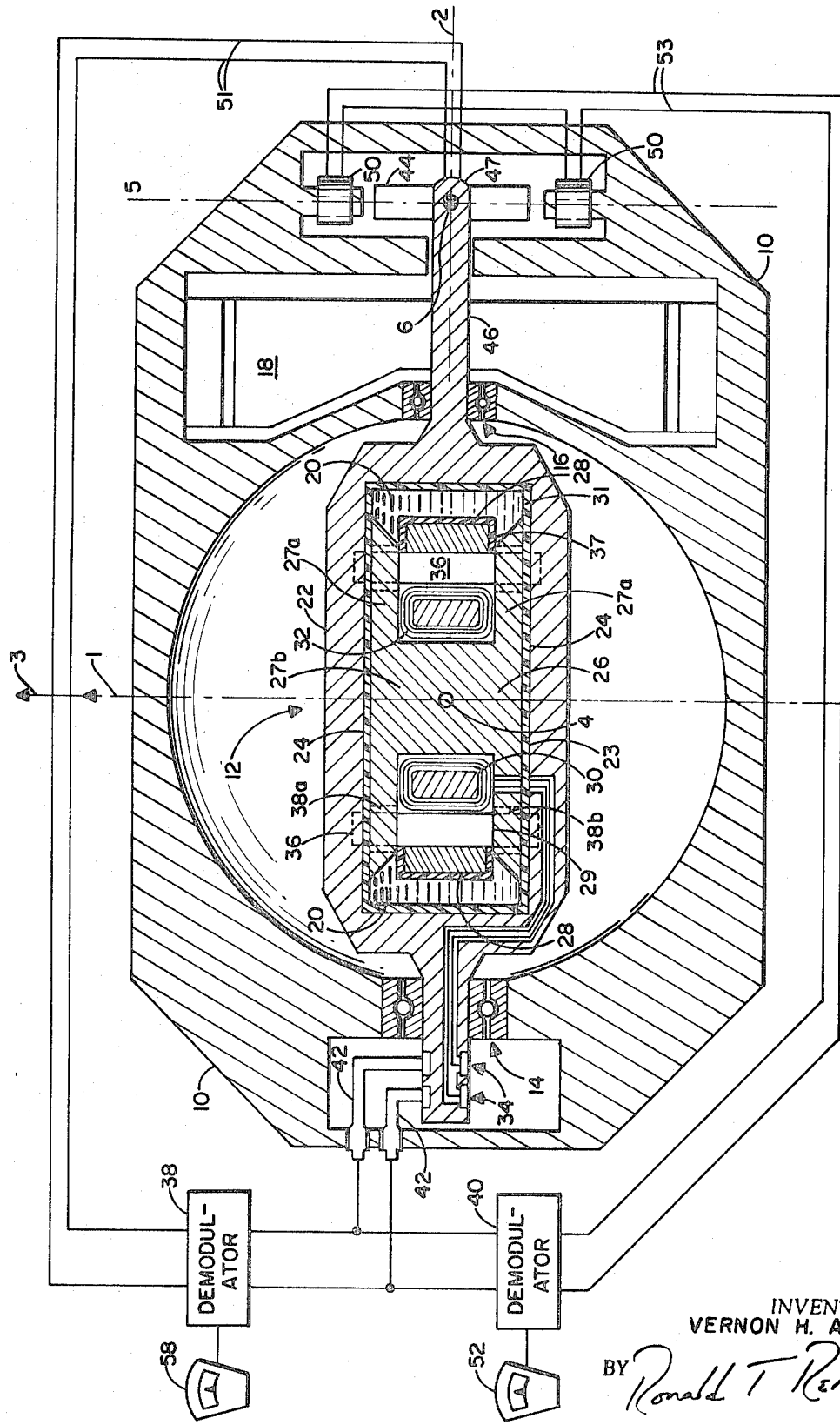
FIG. 1 is a cross-sectional view of a preferred embodiment of my invention.
Figure 2:
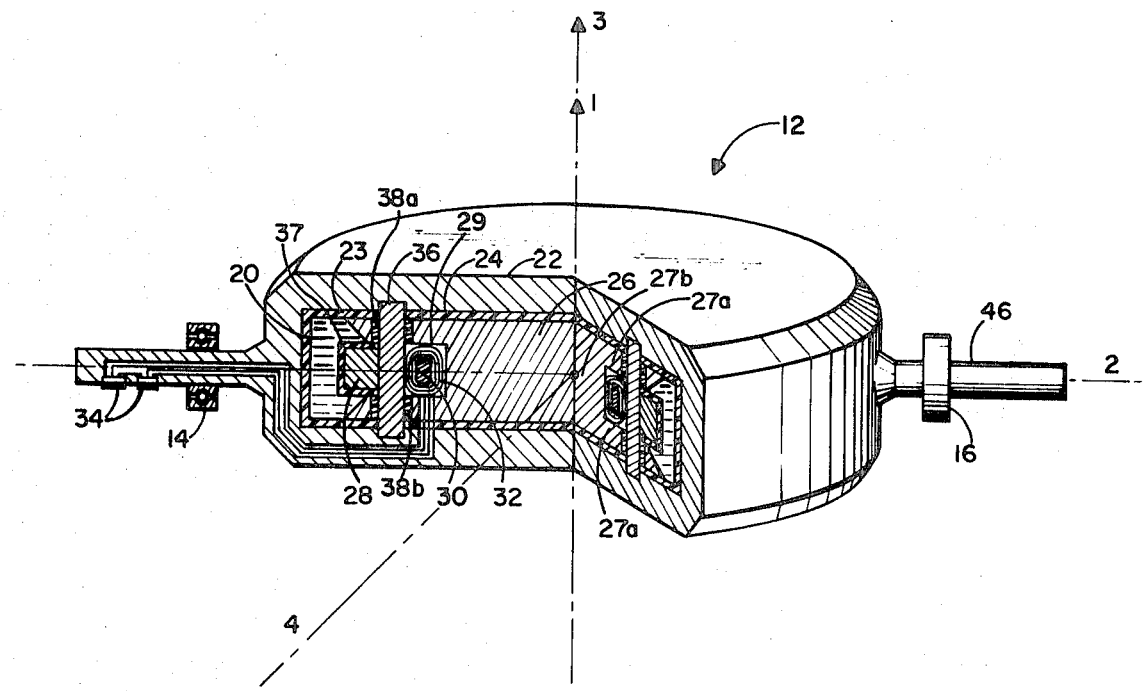
FIG. 2 is a partial cross-sectional view of the angular accelerometer in the preferred embodiment of my invention.

Referring to FIGS. 1 and 2, accelerometer 12 comprises cylindrical housing 22, the interior of which has been removed to form a cylindrical chamber 23. Within the chamber 23 a spool-shaped member 26 is mounted. Spool-shaped member 26 is formed of electrically conductive material and has a pair of rim portions 27a separated by a reduced diameter portion 27b so as to form an annular cavity 29. The spool-shaped member 26 is separated from the housing 22 by a lining 24 of insulative material which covers the inside of the cylindrical chamber 23.

Within the annular cavity 29 a toroidal coil 32 is wound upon a core 30. Coil 32 surrounds and is adjacent to reduced diameter portion 27b of spool-shaped member 26.

A plurality of magnetically conductive return poles 36 is mounted in housing 22 so as to extend from the upper portion of housing 22 through the upper portion of lining 24, upper rim portion 27a of spool-shaped member 26, annular cavity 29, lower rim portion 27a of spool-shaped member 26, lower portion of lining 24 and into the lower portion of housing 22. Return poles 36 are circumferentially spaced around and adjacent to toroidal coil 32 and are separated from spool 26 by electrically insulating layers 38a and 38b.

A toroidal magnet 28 is mounted in annular cavity 29 proximate the extremities of rim portions 27a and adjacent the plurality of return poles 36. An electrical insulation 37 surrounds the toroidal magnet 28 except where it is adjacent the plurality of return poles 36.

The apparatus including spool-shaped member 26, toroidal coil 32, return poles 36 and toroidal magnet 28 including its insulative material 37 extends radially throughout cylindrical chamber 23 of housing 22 and cooperates with the housing 22 to form a toroidal cavity 31. Toroidal cavity 31 is filled with mercury 20. It should be noted that other conductive liquids can be utilized.

As can be seen in FIGS. 1 and 2, a magnetic path exists from toroidal magnet 28 radially outwardly through insulation 37 and mercury 20 and back to toroidal magnet 28 through housing 22 and return poles 36.

Accelerometer 12 is sensitive to acceleration about an axis 1, or any angular acceleration having a vector component along axis 1. Acceleration about an axis 1 will cause circumferential movement of mercury 20 with respect to housing 22 and toroidal magnet 28. As mercury 20 moves circumferentially with respect to toroidal magnet 28 it will cut the magnetic flux in the above-described magnetic path and generate an E.M.F. which is manifested by a difference in potential between the upper and lower portions of mercury 20 as viewed in FIG. 1. This E.M.F. produces a small electric current which travels from the upper portion of mercury 20, for example, through upper rim portion 27a of spool-shaped member 26, the reduced diameter portion 27b and lower rim portion 27a back to the lower portion of mercury 20. The current in turn establishes a magnetic field in core 30. Any change in this magnetic field induces a current in toroidal coil 32. The magnitude of this current is indicative of the movement of mercury 20 relative to housing 22; this movement is indicative of the velocity about axis 1.

The winding 32 on core 30 is connected to a pair of slip rings 34 on housing 22. Slip rings 34 cooperate with a pair of brushes 42 which are connected to a pair of demodulators 38 and 40. However, other means for transferring the output signal of accelerometer 12 to a pair of demodulators 38 and 40 could be substituted for slip rings 34 and brushes 42.

Angular accelerometer 12 is mounted within a housing 10 by bearings 14 and 16 such that it can rotate about an axis 2 which is perpendicular to axis 1, the accelerometer's sensitive axis. Accelerometer 12 could be mounted to rotate about any axis except its sensitive axis and still operate satisfactorily in this invention. For purposes of this specifictaion, the applicant defines the word oblique to mean not parallel. Thus defined oblique includes perpendicular. The only requirement of the applicant's invention is that the accelerometer 12 is moved, e.g., oscillated or rotated about an axis which is oblique with respect to the sensitive axis of the accelerometer. An electric motor 18 is mounted within housing 10 to rotate angular accelerometer 12 about axis 2 at a substantially constant angular velocity in the particular embodiment illustrated in FIGS. 1 and 2. However, it should be noted that it is not necessary to rotate accelerometer 12 at a constant angular velocity for the proper operation of the invention. It is only necessary to cause the angle between the sensitive axis of accelerometer 12 and a measurement axis to vary with time. Accordingly, any suitable means for moving the sensitive axis 1 of accelerometer 12 relative to housing 10 may be utilized.

A pair of coils 50 is mounted diametrically opposite each other within housing 10 such that their common axis 5 is perpendicular to axis 2 but parallel to a measurement axis 3. In FIG. 1, measurement axis 3 and axis 5 are vertical axes in the plane of the paper. An axis 6 (see FIG. 1) is perpendicular to the plane of the paper and intersects with axis 5 near the extremity of shaft 46. A magnet 44 is mounted on a shaft 46 of accelerometer housing 22 such that it may rotate in a plane containing axes 5 and 6. Coils 50 are connected by a pair of leads 53 to a demodulator 40 which drives a readout meter 52 or other suitable readout means.

A pair of coils 47 is mounted diametrically opposite each other within housing 10 and may be identical to coils 50 except that their common axis 6 is perpendicular to axis 5. Coils 47 are connected to demodulator 38 by a pair of leads 51, and demodulator 38 drives a readout meter 58 or other suitable readout means.

The applicant's invention includes the method for measuring angular velocity about one or more measurement axes using an angular accelerometer sensitive to angular acceleration about a single axis. By properly moving the accelerometer with respect to the unknown angular velocity, the accelerometer is made to experience the velocity as an acceleration and accordingly produce an output. On appropriate demodulation, this output will be indicative of the unknown angular velocity about the measurement axis.

By moving the accelerometer so that its sensitive axis sweeps through varying degrees of alignment with the angular velocity vector lying along each of a plurality of measurement axes, the single axis accelerometer produces an output indicative of the angular velocity about each such measurement axis. Then when the accelerometer output is resolved into components due to the angular velocity about respective measurement axes and properly demodulated, the single axis accelerometer becomes essentially a multi-axis velocity or rate sensor.

This method of measuring angular velocity about a plurality of measurement axes using a single axis angular accelerometer will become more clear in the following explanation of the operation of the preferred embodiment apparatus.

It should be noted that although the preferred embodiment accelerometer of FIGS. 1 and 2 is of the open loop type, either an open loop or closed loop accelerometer will perform satisfactorily in the present invention.

The open loop accelerometer illustrated in FIGS. 1 and 2 is designed to measure angular velocity about a measurement axis 3 and a measurement axis 4. In operation of the preferred embodiment, accelerometer 12 is rotated at a substantially constant rate about rotational axis 2 by a motor 18 in FIG. 1. The angular accelerometer is thus made to sense an acceleration due to the fact that the alignment of its sensitive axis 1 with measurement axes 3 and 4 changes with time. Stated otherwise, the accelerometer experiences a change in velocity with time which is an acceleration. As accelerometer 12 is moved about axis 2, its sensitive axis 1 first becomes aligned with axis 3 and upon rotating 90° further, it then becomes aligned with axis 4.

FIGS. 3A through 3D illustrate the motion of accelerometer 12 with a constant rotational rate $\omega_r$ applied about rotation axis 2 and a constant input rate $\omega_m$ applied about measurement axis 3.

Since accelerometer 12 is continuously rotating about rotational axis 2, a constant velocity about measurement axis 3 will appear to the accelerometer to be reversing each time the accelerometer rotates 180° about the rotational axis 2. Because the accelerometer's sensitive axis rotates through varying degrees of alignment with the angular velocity vector lying along measurement axis 3, the component of that vector which lies along the sensitive axis 1 varies with time. This time-changing velocity is, as the accelerometer sees it, an acceleration to which it responds by producing an output signal represented by $\omega_s$ in FIG. 3E. As explained, this output is proportional to the current induced in toroidal coil 32 by the relative movement between mercury 20 and toroidal magnet 28. By applying the proper open loop angular accelerometer equations, it can be shown that $\omega_s$ is proportional to $\omega_m \sin \omega_r t$, where $t$ is time. Thus the magnitude of the output signal $\omega_s$ is proportional to the unknown rate $\omega_m$ about measurement axis 3, and $\omega_r$, the rotation rate about rotation axis 2, determines only the frequency of the output signal. For this reason the speed of rotation motor 18 need not be regulated.

Consider now the situation where there is a constant angular velocity about the sensitive axis 1 of a closed loop accelerometer. There will be no output signal produced because both housing 22 and mercury 20 rotate about axis 1 at that constant velocity. That is, there is no motion of mercury 20 relative to housing 22.

Figure 3A:
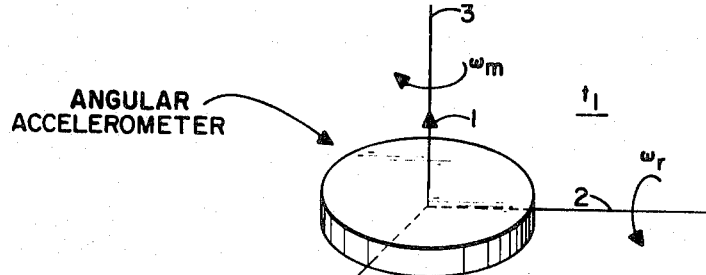
FIG. 3 is a schematic diagram which illustrates the movement of the angular accelerometer and the signal obtained therefrom when utilizing the applicant's unique method of measuring angular velocity.
Figure 3B:
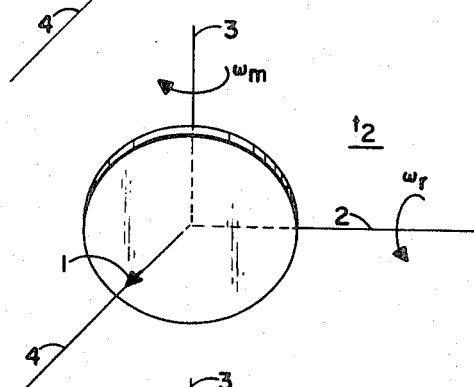
Figure 3C:
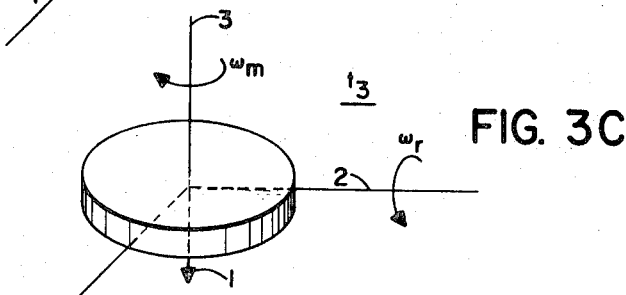
Figure 3D:
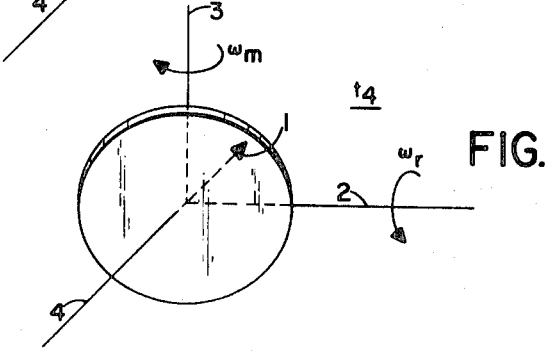
Figure 3E:
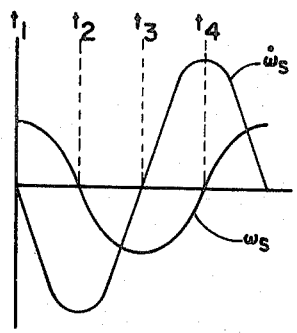

FIG. 3E illustrates the output signal $\dot{\omega}_s$ of a closed loop accelerometer as it rotates through one revolution about axis 2. The instantaneous rate of rotation about the sensitive axis of the accelerometer is represented by the equation $\omega_s = \omega_m \sin \omega_r t$. This rate is illustrated in FIG. 3E. The accelerometer does not respond to this instantaneous angular velocity. However, as explained previously, the accelerometer is being moved so as to experience a time rate of change of the rotational velocity which is an acceleration. The acceleration experienced by the accelerometer is the time derivative of the in instantaneous rate experienced. Thus, the closed loop accelerometer output signal is represented by the equation $$\dot{\omega}_s = \omega_r \omega_m \cos \omega_r t$$

where $\dot{\omega}_s$ is the time derivative $\omega_s$, the instantaneous rate. The output signal of the accelerometer has a frequency equal to the (constant) frequency of rotation $\omega_r/2\pi$ about rotation axis 2 and amplitude proportional to the rotation rate $\omega_m$ about measurement axis 3. At time $t_1$, the accelerometer's sensitive axis 1 is aligned with the measurement axis 3. Since the velocity about measurement axis 3, $\omega_m$, is constant, the accelerometer will produce zero output. As the sensitive axis 1 rotates from its original position about axis 2, it passes through varying degrees of alignment with the angular velocity vector lying along axis 3. The component of that vector which lies along sensitives axis 1 varies with time. This time changing velocity is an acceleration and so the accelerometer provides an output signal indicative thereof. At time $t_2$, the accelerometer has rotated 90° about rotational axis 2 so its sensitive axis 1 is now perpendicular to measurement axis 3. At this time, the rate of change of the length of the vector component lying along sensitive axis 2 is maximum, so the accelerometer's output is maximum. The accelerometer continues to rotate about rotational axis 2 sensing a time varying angular velocity. At time $t_3$, its sensitive axis 1 again aligns with measurement axis 3, but in the opposite direction from the previous alignment at time $t_1$. Because the accelerometer's sensitive axis 1 is again aligned with a constant velocity vector, $\omega_m$, the accelerometer again produces zero output. At $t_4$, the accelerometer has rotated another 90° about its rotational axis 2 so that its sensitive axis 1 is again perpendicular to measurement axis 3. As at $t_2$, the accelerometer is now experiencing a maximum rate of change of the length of the vector component of $\omega_m$ which lies along sensitive axis 1. Accordingly, its output is again maximum. As the accelerometer rotates still another 90° about rotational axis 2, it again assumes the same position as at $t_1$. Thus, a constant velocity about measurement axis 3 will be reflected by a sinusoidal output from the closed loop accelerometer, represented by $\dot{\omega}_s$ in FIG. 3E.

Since the relation between the accelerometer output signal and $\omega_m$, the velocity about the measurement axis, is constant, the accelerometer output signal is demodulated to provide a signal indicative of $\omega_m$, the unknown velocity about the measurement axis 3. This may be accomplished by using an angular measuring device which generates a reference signal indicative of the rotational position of the accelerometer about rotation axis 2 and then comparing the output signal of the accelerometer to this reference signal. More specifically, referring to FIG. 1, magnet 44 induces a sinusoidal signal in coils 50 as shaft 46 turns. This generated signal is conveyed to demodulator 40 by wires 53. The signal has a frequency equal to the rotational frequency of accelerometer 12 about rotation axis 2 and phase indicative of the orientation of the accelerometer's sensitive axis 1 with respect to measurement axis 3.

The output signal of the accelerometer is also conveyed to demodulator 40 through slip rings 34. Demodulator 40 compares the signal from coils 50 with the accelerometer output signal and provides a signal at readout meter 52 indicative of the angular velocity about measurement axis 3.

The preferred embodiment illustrated in FIGS. 1 and 2 is capable of sensing rotation rate about another measurement axis 4, perpendicular to the plane of the paper in FIG. 1. This is accomplished by demodulating the accelerometer output signal with respect to a reference signal 90° out of phase from the first reference signal. This second reference signal is generated in coils 47. Just as the former reference signal was generated in coils 50, rotation of magnet 44 induces the second reference signal in coils 47. Because coils 47 are oriented 90° from coils 50, the signal from coils 47 will be shifted 90° in phase from the signal generated in coils 50. Coils 47 are connected to a demodulator 38 by a pair of leads 51. The operation of demodulator 38 parallels the operation of demodulator 40 to provide an output indicative of angular rate about measurement axis 4.

Although the rate sensor of FIG. 1 measures rate about only vertical measurement axis 3 and a second measurement axis 4 perpendicular to the plane of paper, any number or configuration of measurement axes not coincident with the rotation axis of accelerometer 12 could be used as long as means, such as coils, 50, is provided so as to render the appropriate reference signal.

Figure 4:
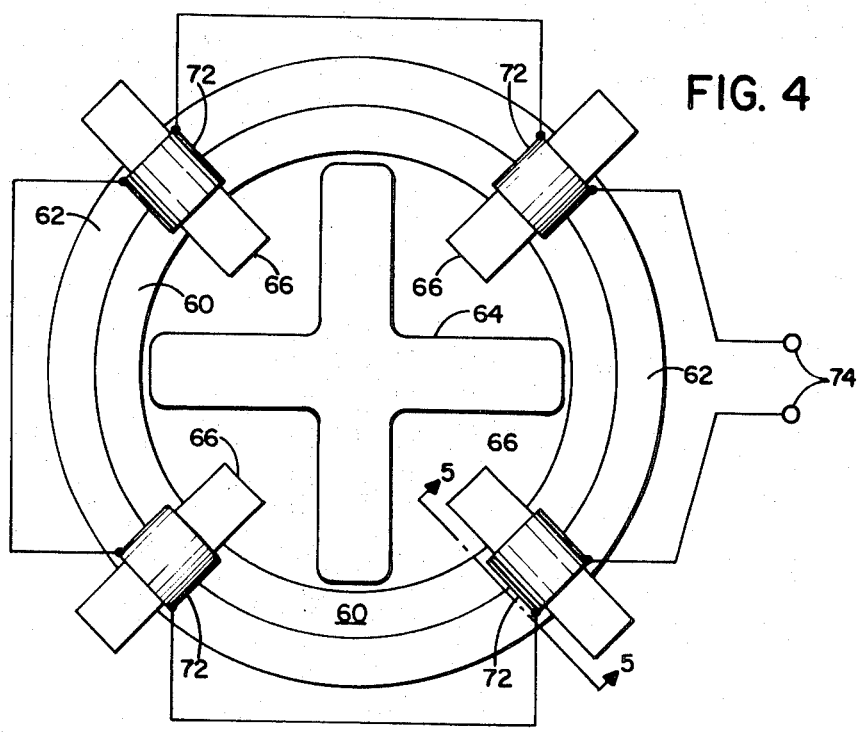
FIG. 4 is a top view of an alternative accelerometer for use in my invention.
Figure 5:
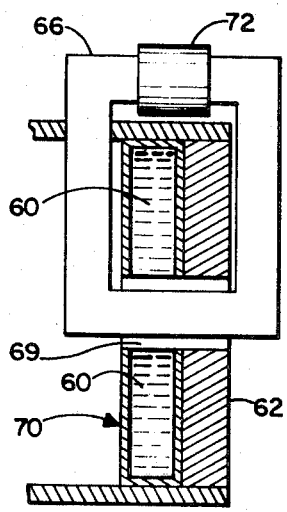
FIG. 5 is a cross-sectional view taken along section line 5—5 of one of the transformers of FIG. 4.

FIGS. 4 and 5 show an alternate type of accelerometer which could be employed in the present invention. To avoid confusion, a number of parts, such as electrical insulation and structural supports, are not shown in FIG. 5. Again, an annular ring of mercury 60 is utilized. This mercury travels in a channel just inside a magnetically conductive material comprising annular ring 62. A four-pole magnet assembly 64 inside annular mercury ring 60 is constructed to have two north and two south poles. Magnet assembly 64 may be built from four bar magnets or two crossed bar magnets or any other suitable arrangement. Again a radial field extends from each pole of magnet 64 out through the mercury to the return path ring 62 and back through mercury 60 to an opposite pole. Angular acceleration causes mercury 60 to move with respect to the magnetic field at the poles of magnet 64. As a result current loops are induced in mercury ring 60. These current loops induce a magnetic field in a plurality of transformers 66 spaced about the circumference of mercury ring 60. FIG. 5 shows a side view of one of transformers 66. A sealed hole 69 is constructed through a chamber 70, mercury ring 60, and magnetic return path ring 62. The core of transformer 66 passes through this hole so that the aforementioned current loops in mercury ring 60 will induce a magnetic field in transformers 66, thus resulting in an output voltage in secondary windings 72. Four transformers are shown in a series connection to the output terminals 74. The voltage at terminals 74 will be proportional to the relative movement of mercury ring 60 with respect to the poles of magnet assembly 64. Since this relative movement is proportional to angular acceleration, the voltage at terminals 74 is proportional to angular acceleration.

I claim:
1. An angular velocity sensor operable to measure angular velocity about a plurality of measurement axes comprising:
   an angular accelerometer capable of producing an output signal indicative of angular acceleration about a single sensitive axis, the angular accelerometer comprising an annular ring of mercury contained within a housing for free movement about the sensitive axis of the accelerometer, a magnet positioned within the housing contigous to the annular ring of mercury for providing a magnetic field through the mercury such that movement of the mercury with respect to the housing results in a current within the annular ring of mercury indicative of the relative rate of movement, coil means positioned within the housing proximate the annular ring of mercury, and means within the housing for providing a current path from the mercury around the coil means, the coil means producing an output signal indicative of a change in the current therearound;

means for rotating the angular accelerometer about an axis oblique to its sensitive axis such that the angle between the accelerometer sensitive axis and each measurement axis varies with time;

means for generating a reference signal indicative of the position of the accelerometer sensitive axis relative to each measurement axis; and means for comparing each reference signal to the output of the accelerometer to provide an output signal indicative of the angular rate about each measurement axis.

2. Apparatus of claim 1 where the means for rotating the angular accelerometer about an axis rotates the angular accelerometer about an axis perpendicular to its sensitive axis, and each of two measurement axes is perpendicular to the axis of rotation and in turn mutually perpendicular to the other.

3. The apparatus of claim 1 wherein the coil means is disposed within the mercury.

References Cited

UNITED STATES PATENTS

| | | | |
|---|---|---|---|
| 2,753,469 | 7/1956 | Statham et al. | 73—516 |
| 3,072,807 | 1/1963 | Stedman | 73—516 |
| 3,083,578 | 4/1963 | Rosato et al. | 73—505 |
| 3,142,991 | 8/1964 | Pittman | 73—504 |
| 3,149,250 | 9/1964 | Luebke | 310—11 |
| 3,253,471 | 5/1966 | Maillard | 73—505 |
| 3,306,113 | 2/1967 | Tuccinardi | 73—505 |

RICHARD C. QUEISSER, Primary Examiner

H. GOLDSTEIN, Assistant Examiner

UNITED STATES PATENT OFFICE
CERTIFICATE OF CORRECTION

Patent No. 3,618,399            Dated November 9, 1971

Inventor(s) Vernon H. Aske

It is certified that error appears in the above-identified patent and that said Letters Patent are hereby corrected as shown below:

Column 1, line 20, after "to" insert --select the desired component--.

Signed and sealed this 11th day of April 1972.

(SEAL)
Attest:

EDWARD M. FLETCHER, JR.
Attesting Officer

ROBERT GOTTSCHALK
Commissioner of Patents